(12) United States Patent
Grass et al.

(10) Patent No.: US 11,997,938 B2
(45) Date of Patent: Jun. 4, 2024

(54) ARTICULATED APPARATUS FOR TOWING A ROTARY DRIVEN IMPLEMENT FROM A TOWING VEHICLE

(71) Applicant: J A Redekop Holding Ltd., Winkler (CA)

(72) Inventors: Martin Grass, Winkler (CA); Waldemar Berg, Winkler (CA); Johan Redekop, Winkler (CA)

(73) Assignee: J A REDEKOP HOLDING LTD., Winkler (CA)

( * ) Notice: Subject to any disclaimer, the term of this patent is extended or adjusted under 35 U.S.C. 154(b) by 664 days.

(21) Appl. No.: 16/996,177

(22) Filed: Aug. 18, 2020

(65) Prior Publication Data
US 2021/0168990 A1  Jun. 10, 2021

Related U.S. Application Data

(60) Provisional application No. 62/945,615, filed on Dec. 9, 2019.

(51) Int. Cl.
| | |
|---|---|
| *A01B 71/06* | (2006.01) |
| *A01B 59/042* | (2006.01) |
| *A01B 69/00* | (2006.01) |
| *A01D 67/00* | (2006.01) |
| *A01D 69/00* | (2006.01) |

(52) U.S. Cl.
CPC .......... *A01B 71/066* (2013.01); *A01B 59/042* (2013.01); *A01D 67/005* (2013.01); *A01D 69/002* (2013.01)

(58) Field of Classification Search
CPC ..... A01B 71/066; A01B 71/06; A01B 59/042; A01B 69/003; A01B 63/16; A01B 59/002; A01B 67/005; A01B 69/002; A01D 67/005; A01D 69/002; A01D 75/30; A01D 75/303; A01D 75/306
See application file for complete search history.

(56) References Cited

U.S. PATENT DOCUMENTS

| | | | |
|---|---|---|---|
| 2,421,044 A | 5/1947 | Vutz | |
| 3,893,283 A * | 7/1975 | Dandl | A01B 63/023 56/13.6 |
| 4,525,987 A | 7/1985 | Werner et al. | |

(Continued)

FOREIGN PATENT DOCUMENTS

| | | | | |
|---|---|---|---|---|
| FR | 2904182 A1 * | 2/2008 | ........... | A01B 59/042 |

*Primary Examiner* — Thomas B Will
*Assistant Examiner* — Madeline I Runco
(74) *Attorney, Agent, or Firm* — Ryan W. Dupuis; Kyle R. Satterthwaite; Ade & Company Inc.

(57) ABSTRACT

An articulated towing apparatus pulls a rotary driven implement in a forward working direction across a ground surface behind a towing vehicle. The apparatus includes a longitudinal frame pivotally connected at a leading end to the towing vehicle by a coupling frame and pivotally connected at a trailing end to a wheeled frame that supports the implement thereon. The coupling frame defines lateral and vertical pivot axes between the longitudinal frame and the towing vehicle. A drive line, connected between a power take-off of the towing vehicle and the implement, includes (i) a longitudinal drive shaft extending at a downward slope, and (ii) an output for connection to the implement that is rotatably supported on the wheeled frame.

19 Claims, 5 Drawing Sheets

(56) References Cited

U.S. PATENT DOCUMENTS

| | | | |
|---|---|---|---|
| 4,714,123 A | 12/1987 | Ermacora et al. | |
| 5,201,167 A * | 4/1993 | Rowse | A01D 75/30 |
| | | | 280/412 |
| 7,334,645 B2 | 2/2008 | Stevenson et al. | |
| 9,504,202 B2 | 11/2016 | Neudorf et al. | |
| 2005/0161905 A1 * | 7/2005 | Chalancon | A01B 59/042 |
| | | | 280/494 |
| 2008/0295475 A1 * | 12/2008 | Boyko | A01D 34/86 |
| | | | 56/15.8 |
| 2012/0151892 A1 * | 6/2012 | Clark | B60D 1/62 |
| | | | 56/15.7 |
| 2015/0061261 A1 * | 3/2015 | Bergum | B60D 1/02 |
| | | | 280/515 |
| 2020/0068780 A1 * | 3/2020 | Anderson | A01B 59/002 |
| 2020/0236855 A1 * | 7/2020 | Bertino | A01D 69/002 |

* cited by examiner

ARTICULATED APPARATUS FOR TOWING A ROTARY DRIVEN IMPLEMENT FROM A TOWING VEHICLE

This application claims the benefit under 35 U.S.C. 119 (e) of U.S. provisional application Ser. No. 62/945,615, filed Dec. 9, 2020.

FIELD OF THE INVENTION

The present invention relates to a towing apparatus for connection between a towing vehicle and an implement to be towed which is articulated to allow the implement to be towed in a laterally offset relationship to the towing vehicle, and more particularly the present invention relates to an articulated towing apparatus which is able to transfer drive from the power take-off shaft of the towing vehicle to the implement.

BACKGROUND

When towing an implement behind a tractor, such as a mower deck driven by a power take-off of the tractor, it is desirable in some instances to tow the implement along a path which is laterally offset to one side relative to the towing vehicle, for example when it is desirable to tow a mower deck along an inclined ditch while the tractor remains along the adjacent road to prevent tipping of the tractor into the ditch.

In some instances, the mower itself is capable of being towed in an offset arrangement by being provided with a dedicated towing arm as described in U.S. Pat. Nos. 4,525,987 and 4,714,123 both by Kuhn, S. A. In each instance the offset arm is an integral part of the mower deck such that the mower deck cannot be used for direct connection to the towing vehicle as may be desired in some instances. Furthermore, the offset towing arm cannot be used with other implements. High clearance is provided by the dedicated towing arm, however, in each instance the frame includes a longitudinal frame member extending horizontally from the towing vehicle to the mower deck such that the rear end of the frame member obstructs the operator's view of the implement.

In other instances, an independent towing arm is provided for connection between the tractor and a towed implement. One such example is described in U.S. Pat. No. 2,421,044 by Vutz; however, this device is provided with low clearance which is problem when passing over any large ground contours and slopes. Other examples of towing arms which can be used between a tractor and an implement include U.S. Pat. No. 7,334,645 by Degelman Industries Ltd and U.S. Pat. No. 9,504,202 by Highline Manufacturing Ltd; however, in each instance high clearance is only provided by a longitudinal frame member extending horizontally from the towing vehicle to the mower deck such that the rear end of the frame member again obstructs the operator's view of the implement.

SUMMARY OF THE INVENTION

According to one aspect of the invention there is provided an articulated towing apparatus for pulling a rotary driven implement in a forward working direction across a ground surface behind a towing vehicle having a power take-off member, the apparatus comprising:
  a longitudinal frame which is elongate in a longitudinal direction between a leading end and a trailing end;
  a wheeled frame supported on wheels for rolling movement along the ground surface, the wheeled frame being pivotally coupled to the longitudinal frame in proximity to the trailing end such that the wheeled frame is pivotal relative to the longitudinal frame about a first upright axis, and the wheeled frame being adapted to releasably connect the rotary driven implement thereto in trailing relationship with the wheeled frame;
  a coupling frame adapted to be connected to the towing vehicle, the coupling frame being pivotally coupled to the longitudinal frame in proximity to the leading end such that the coupling frame is pivotal relative to the longitudinal frame about a second upright axis;
  a driveline including a longitudinal drive shaft supported on the longitudinal frame, the longitudinal drive shaft being operatively connected to an input member at a leading end of the driveline and being operatively connected to an output member at a trailing end of the driveline, the input member being adapted to connect to the power take-off member of the towing vehicle and the output member being adapted to connect to the rotary driven implement;
  the driveline further comprising:
    a lower gearbox supported on the coupling frame, the lower gearbox having an input connected to the input member and an output;
    an upright shaft connected to the output of the lower gearbox;
    an upper gearbox supported on the longitudinal frame above the lower gearbox in proximity to the leading end of the longitudinal frame, the upper gearbox having an input connected to the upright shaft and an output operatively connected to the longitudinal drive shaft; and
    a universal connection at the trailing end of the longitudinal frame, the universal connection operatively connecting the longitudinal drive shaft to the output member of the driveline;
    the longitudinal drive shaft extending at a downward slope from the leading end to the trailing end of the driveline.

Preferably the longitudinal frame is hollow and receives the longitudinal drive shaft therein. The longitudinal frame may further include a tubular frame member spanning a majority of a length of the longitudinal frame, the tubular frame member extending at a downward slope from the leading end to the trailing end of the longitudinal frame and receiving the longitudinal drive shaft therein.

Use of a longitudinal drive shaft extending at a downward slope from an arrangement of gearboxes at the leading end of the frame enables high clearance at the leading end of the frame and a low elevation at the trailing end of the frame to maintain high clearance for the implement while also not obstructing the operator's view of the implement and the field conditions rearward of the implement.

Preferably the output member is rotatably supported on the wheeled frame, whereby the output member is pivotal about the first upright axis with the wheeled frame relative to the longitudinal frame. The output member may be rotatably supported on the wheeled frame at a location spaced rearwardly from the first upright axis.

The universal connection of the driveline may comprise an intermediate shaft operatively connected to the longitudinal drive shaft by a first universal joint ahead of the first upright axis and operatively connected to the output member by a second universal joint behind the first upright axis.

The wheeled frame preferably comprises a crossbar member pivotally coupled to the trailing end of the longitudinal frame for relative pivotal movement about the first upright axis, in which the crossbar member extends in a lateral direction between opposing ends and in which each opposing end supports a respective one of the wheels thereon. In this instance, the wheeled frame is preferably adapted to releasably connect the rotary driven implement thereto at a location spaced rearwardly of the first upright axis.

The driveline may further comprise a universal connection operatively connecting the longitudinal drive shaft to the output of the upper gearbox. In this instance, the coupling frame may comprises: (i) an intermediate portion supporting the lower gearbox thereon, the intermediate portion being connected to the longitudinal frame for relative pivotal movement about the second upright axis; and (ii) a coupling portion adapted to be connected to the towing vehicle, in which the coupling portion and the intermediate portion are pivotally coupled to one another for relative pivotal movement about a longitudinal roll axis oriented in the forward working direction. The coupling portion may be further adapted to be coupled to the towing vehicle so as to be pivotal relative to the towing vehicle about a lateral axis oriented transversely to the forward working direction. In this instance, the coupling portion may comprise a pair of coupling pins which are spaced apart along the lateral axis at diametrically opposing sides of the driveline.

The driveline is preferably supported in alignment with the longitudinal roll axis at the leading end of the longitudinal frame.

The apparatus may further comprise a latching mechanism operatively connected between the longitudinal frame and the wheeled frame, in which the latching mechanism includes a latch member which is movable between a latched position in which the latch member restricts relative pivotal movement between the longitudinal frame and the wheeled frame about the first upright axis and a released position in which the latch member does not restrict relative pivotal movement between the longitudinal frame and the wheeled frame about the first upright axis.

The latching mechanism is preferably operable to fix the wheeled frame relative to the longitudinal frame in a straight position in which the wheels are oriented for rolling in the longitudinal direction of the longitudinal frame.

The apparatus may further comprise a steering actuator operatively connected between the longitudinal frame and the wheeled frame such that the wheeled frame is pivoted relative to the longitudinal frame about the first upright axis under control of the steering actuator. Preferably the wheeled frame supports the wheels thereon for rolling movement about a wheel axis and the steering actuator comprises a linear actuator which is oriented substantially parallel to the wheel axis.

According to a second aspect of the present invention there is provided an articulated towing apparatus for pulling a rotary driven implement in a forward working direction across a ground surface behind a towing vehicle having a power take-off member, the apparatus comprising:
 a longitudinal frame which is elongate in a longitudinal direction between a leading end and a trailing end;
 a wheeled frame supported on wheels for rolling movement along the ground surface, the wheeled frame being pivotally coupled to the longitudinal frame in proximity to the trailing end such that the wheeled frame is pivotal relative to the longitudinal frame about a first upright axis, and the wheeled frame being adapted to releasably connect the rotary driven implement thereto in trailing relationship with the wheeled frame;
 a coupling frame adapted to be connected to the towing vehicle, the coupling frame being pivotally coupled to the longitudinal frame in proximity to the leading end such that the coupling frame is pivotal relative to the longitudinal frame about a second upright axis;
 a driveline including a longitudinal drive shaft supported on the longitudinal frame, the longitudinal drive shaft being operatively connected to an input member at a leading end of the driveline and being operatively connected to an output member at a trailing end of the driveline, the input member being adapted to connect to the power take-off member of the towing vehicle and the output member being adapted to connect to the rotary driven implement;
 wherein the output member is rotatably supported on the wheeled frame, whereby the output member is pivotal about the first upright axis with the wheeled frame relative to the longitudinal frame.

Preferably the output member is rotatably supported on the wheeled frame at a location spaced rearwardly from the first upright axis.

By providing the output member of the driveline on the wheeled frame, the output of the driveline remains optimally aligned with the driven input on the implement throughout the range of offset movement of the apparatus relative to the towing vehicle and the implement.

According to a further aspect of the present invention there is provided an articulated towing apparatus for pulling a rotary driven implement in a forward working direction across a ground surface behind a towing vehicle having a power take-off member, the apparatus comprising:
 a longitudinal frame which is elongate in a longitudinal direction between
 a leading end and a trailing end;
 a wheeled frame supported on wheels for rolling movement along the ground surface, the wheeled frame being pivotally coupled to the longitudinal frame in proximity to the trailing end such that the wheeled frame is pivotal relative to the longitudinal frame about a first upright axis, and the wheeled frame being adapted to releasably connect the rotary driven implement thereto in trailing relationship with the wheeled frame;
 a coupling frame adapted to be connected to the towing vehicle, the coupling frame being pivotally coupled to the longitudinal frame in proximity to the leading end such that the coupling frame is pivotal relative to the longitudinal frame about a second upright axis;
 a driveline including a longitudinal drive shaft supported on the longitudinal frame, the longitudinal drive shaft being operatively connected to an input member at a leading end of the driveline and being operatively connected to an output member at a trailing end of the driveline, the input member being adapted to connect to the power take-off member of the towing vehicle and the output member being adapted to connect to the rotary driven implement;
 wherein the coupling frame comprises:
  (i) an intermediate portion connected to the longitudinal frame for relative pivotal movement about the second upright axis; and
  (ii) a coupling portion adapted to be connected to the towing vehicle, the coupling portion and the intermediate portion being pivotally coupled to one another for relative pivotal movement about a longitudinal roll axis oriented in the forward working direction.

Preferably the coupling portion is adapted to be coupled to the towing vehicle so as to be pivotal relative to the towing vehicle about a lateral axis oriented transversely to the forward working direction.

The configuration of the coupling frame described herein defines two axes of movement of the apparatus relative to the vehicle with a third axis of movement being optionally provided by the connection of the coupling frame to the towing vehicle. This allows the apparatus to be coupled to the towing vehicle for relative movement about pitch, roll and yaw axes to ensure that the implement closely follows contours and slopes of the ground regardless of the relative position of the towing vehicle.

BRIEF DESCRIPTION OF THE DRAWINGS

One embodiment of the invention will now be described in conjunction with the accompanying drawings in which:

Figures 4, 5:
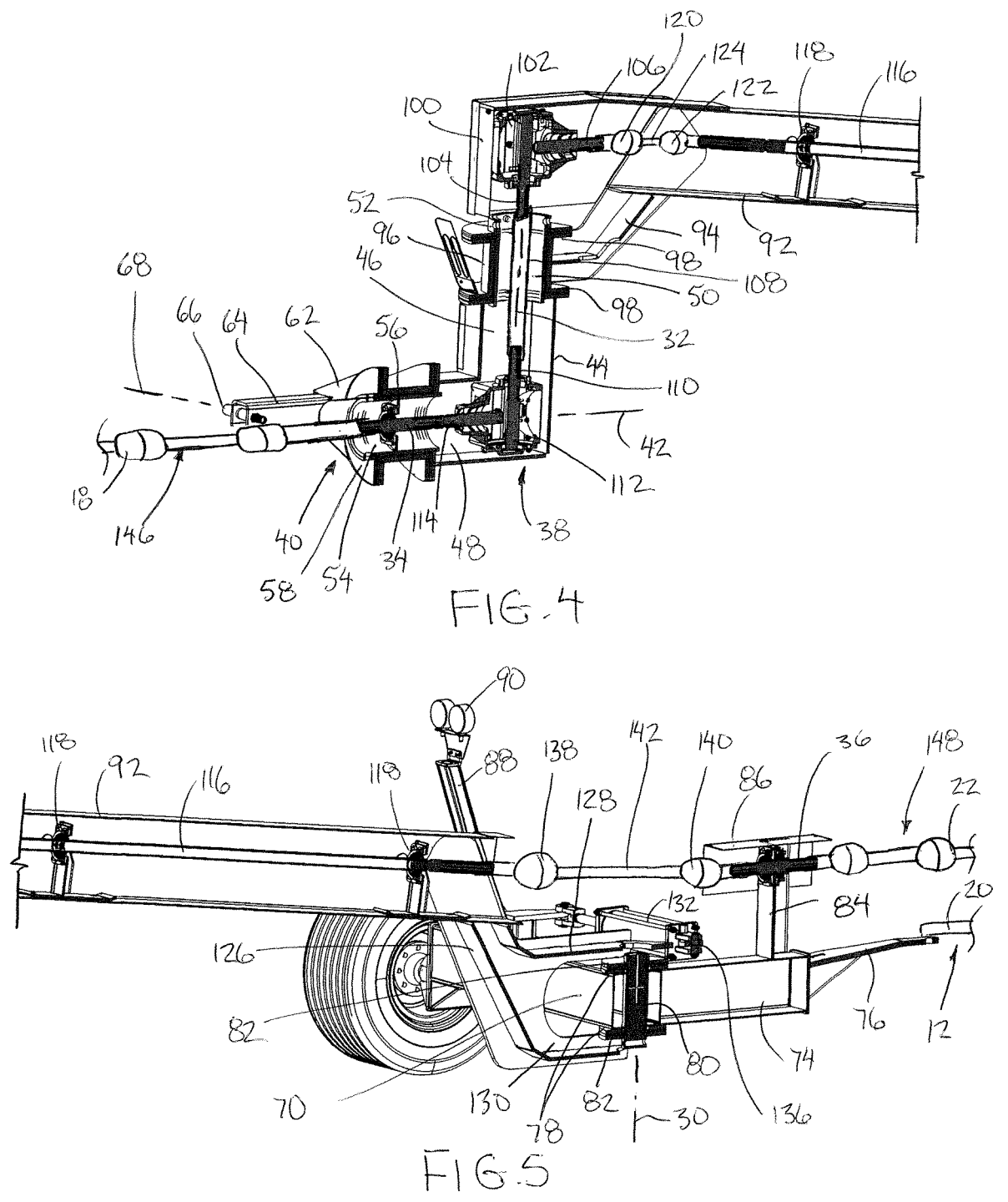

FIG. 4 is a partly sectional view of a leading end of the apparatus along the line 4-4 in FIG. 1;

FIG. 5 is a partly sectional view of a trailing end of the apparatus along the line 4-4 in FIG. 1.

In the drawings like characters of reference indicate corresponding parts in the different figures.

DETAILED DESCRIPTION

Figure 1:
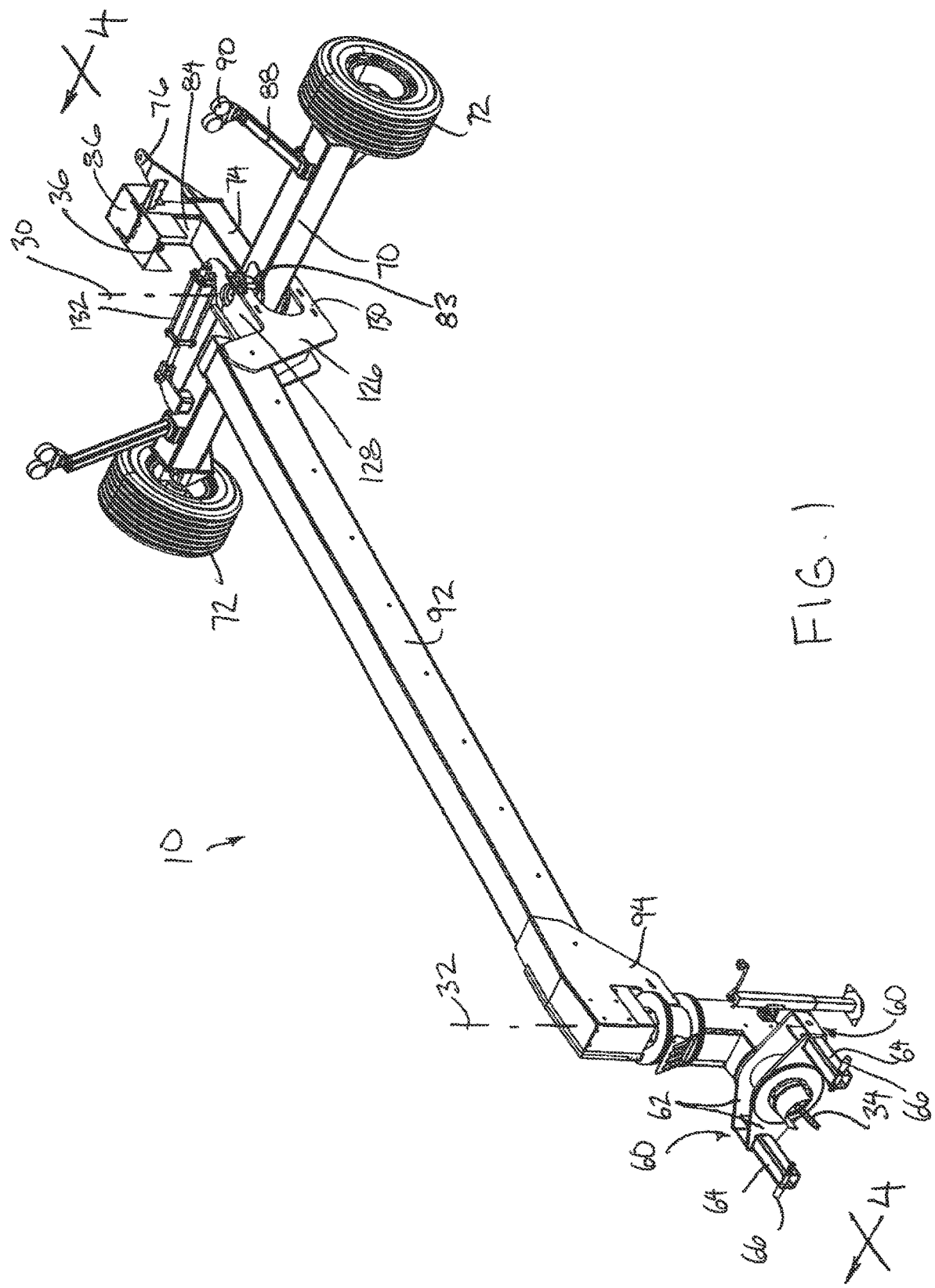
FIG. 1 is a perspective view of the articulated towing apparatus.

Referring to the accompanying figures there is illustrated an articulated implement towing apparatus generally indicated by reference numeral 10. The apparatus 10 is particularly suited for use with a rotary driven implement 12 such as a mower deck, to be towed by a towing vehicle 14 in a forward working direction 15 of the vehicle and the implement.

The towing vehicle 14 may be an agricultural tractor having a frame supported on wheels for rolling movement along the ground, powered by an engine on the frame which drives the wheels. The tractor includes a hitch, for example a three-point hitch having a pair of laterally spaced apart coupling arms 16 arranged to mount various implements thereon to be towed across a ground surface together with the towing vehicle in the forward working direction. The towing vehicle further includes a power take-off shaft 18 which is a rotary driven shaft that is powered by the engine of the tractor directly or indirectly, for example through a hydraulic system of the vehicle.

The implement 12 typically comprises a frame that is also supported on wheels for rolling movement across the ground surface in the forward working direction. The implement 12 includes a hitch connector 20 at a leading end thereof which is typically adapted for connection to the hitch of the towing vehicle for direct towing in trailing relationship with the towing vehicle. The implement also includes a driven element, for example the rotating mower blades on a mower deck. A drive coupling 22 is supported on the mower deck in operative connection with the driven element, in which the drive coupling 22 is adapted for connection to the power take-off shaft 18 or other suitable drive output of a typical towing vehicle.

Figure 3:
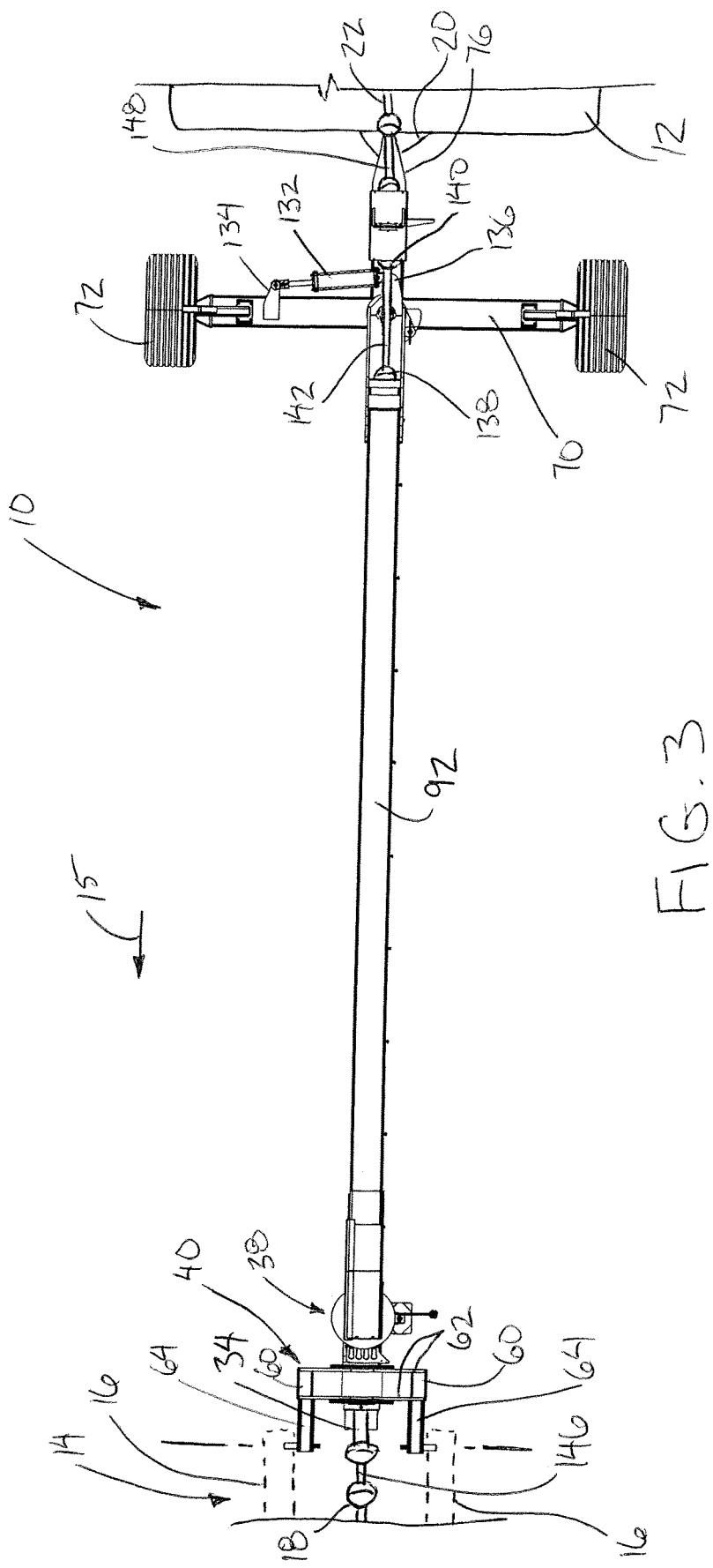
FIG. 3 is a top plan view of the articulated towing apparatus shown connected between a towing vehicle and an implement to be towed in a straight configuration.
Figure 6:
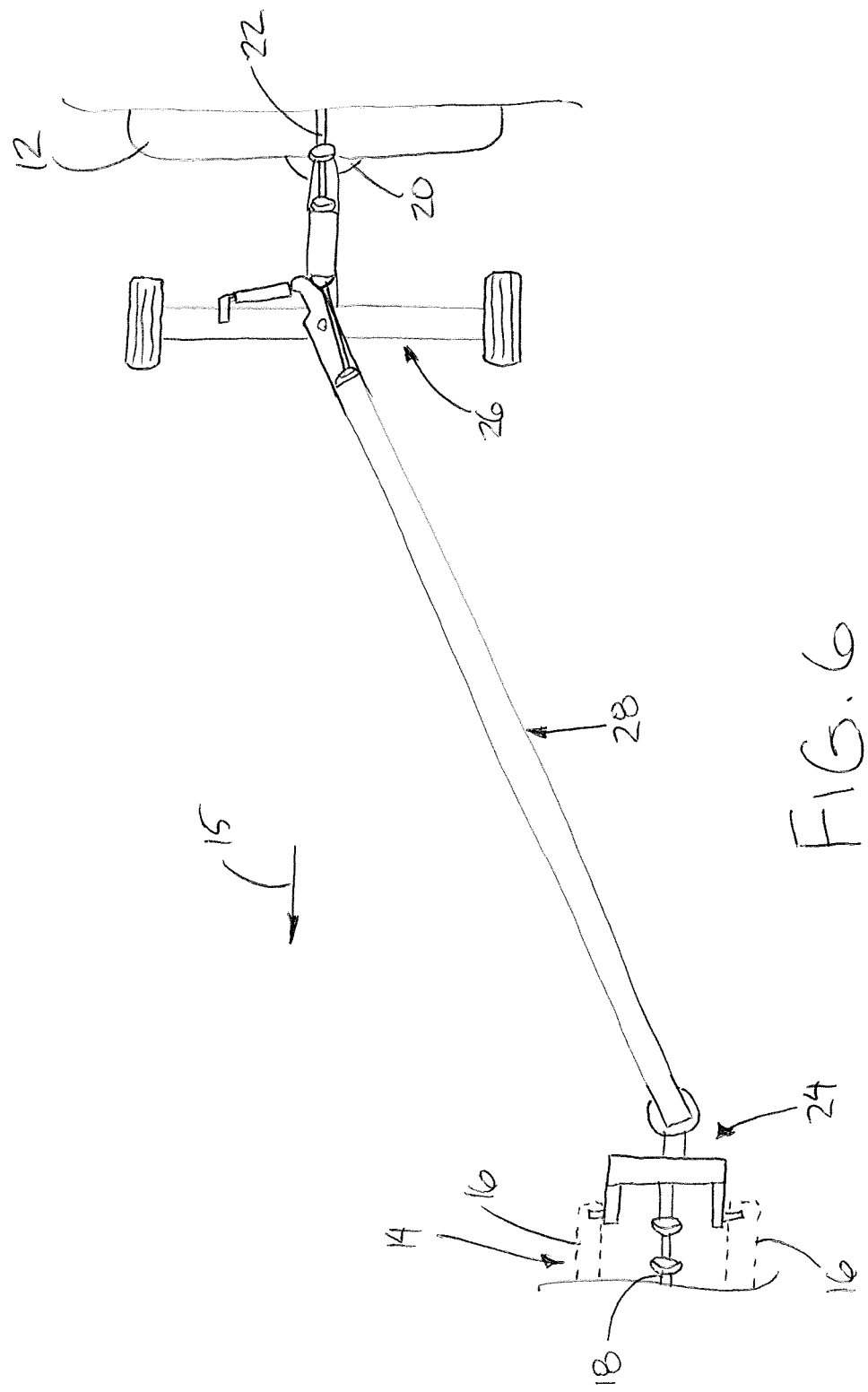
FIG. 6 is a top plan view of the articulated towing apparatus shown connected between the towing vehicle and the implement to be towed in an offset configuration.

The apparatus 10 according to the present invention is intended to be coupled between the towing vehicle 14 and the towed implement 12 so as to enable the implement to be controllably positioned relative to the towing vehicle in a lateral direction perpendicular to the forward working direction. The articulation of the apparatus 10 allows the implement 12 to be displaced from a straight configuration shown in FIG. 3 in which the apparatus 10 is parallel to the forward working direction so that the implement follows the path of the towing vehicle to an offset configuration shown in FIG. 6 in which the apparatus is oriented transversely to the forward working direction so that the implement follows a path that is parallel to and laterally offset to one side of the path of the towing vehicle.

The apparatus 10 generally comprises (i) a coupling frame 24 at a leading end of the apparatus for coupling the apparatus to the towing vehicle, (ii) a wheeled frame 26 at the trailing end of the apparatus which is arranged for rolling movement along the ground, and (iii) a longitudinal frame 28 extending generally in the forward working direction between a trailing end which is pivotally coupled to the wheeled frame 26 for relative pivotal movement about a first upright axis 30 and a leading end which is pivotally coupled to the coupling frame 24 for relative pivotal movement about a second upright axis 32.

In some embodiments, where no power transfer is required between the towing vehicle and the implement, the apparatus 10 may consist only of the coupling frame, the wheeled frame, and the longitudinal frame together with controls for steering the wheeled frame relative to the longitudinal frame.

In the illustrated embodiment, the apparatus 10 further includes a driveline for transferring power from an input member 34 of the driveline which is adapted for connection to the power takeoff shaft of the towing vehicle at the leading end of the apparatus to an output member 36 of the driveline which is adapted for connection to the drive input of the implement at the trailing end of the apparatus.

In the illustrated embodiment, the coupling frame 24 includes an intermediate portion 38 which is pivotally coupled to the leading end of the longitudinal frame to define the second upright axis 32, and a coupling portion 40 which is adapted to be connected to the hitch connector of the towing vehicle. The coupling portion and the intermediate portion 38 of the coupling frame are coupled to one another for relative pivotal movement about a longitudinal rolling axis 42 that is oriented in the forward working direction of the vehicle.

The intermediate portion 38 of the coupling frame comprises a hollow housing 44 having an upper chamber 46 which is generally tubular in shape and which is open at the top end thereof, and a front chamber 48 which is also tubular in shape but is open to the front of the apparatus. The upper chamber and front chamber are openly connected to form a generally L-shaped interior space within the intermediate portion of the coupling frame. An outlet collar 50 is fixed to the top end of the housing with an opening therethrough aligned with the open top end of the upper chamber. A portion of the longitudinal frame is received about the outlet collar 52 so as to maintain relative rotation therebetween about the second upright axis 32. A retainer flange 52 is releasably fastened at the top end of the outlet collar 50 to retain the portion of the longitudinal frame rotatably supported about the outlet collar in an assembled configuration of the apparatus as described in further detail below.

Similarly, an inlet collar 54 is fixed at the front end of the hollow housing so that the opening through the collar is in open communication with the front chamber 48 of the intermediate portion of the coupling frame.

The coupling portion of the coupling frame in this instance includes a sleeve 56 having an inner diameter which closely fits about the outer diameter of the inlet collar 54 such that the sleeve 56 is rotatably supported about the inlet collar 54. The mounting of the sleeve 56 onto the collar 54 defines the longitudinal rolling axis 42 of the coupling portion 40 relative to the intermediate portion 38 of the coupling frame. A retainer flange 58 is releasably fastened at the front end of the inlet collar 54 to retain the sleeve 56 in axial position along the collar 54 whereby the sleeve 56 is retained between the retainer flange 58 at the leading end and is retained by a front wall of the hollow housing 54 at the trailing end thereof. A layer of bushing material having a low efficient of friction or a layer of grease may be provided at the interface between the sleeve 56 and the collar 54 so that the sleeve readily rotates about the collar.

The coupling portion 40 of the coupling frame further comprises two side frames 60 protruding outwardly from diametrically opposing sides of the sleeve 56 in fixed relation therewith such that the side frames 60 rotate with the sleeve relative to the collar 54. The side frames are defined by a pair of plates 62 which are fixed to the sleeve 56 and which are coupled by transverse end plates such that the two plates 62 form a rigid frame. The plates 62 are oriented perpendicularly to the axis of the sleeve 56 at axially opposing leading and trailing ends of the sleeve for abutting the inner surface of the retainer flange 58 at the leading end of the sleeve and for abutting the forward face of the front wall of the housing 54 at the trailing end of the sleeve.

The side frames 60 which extend radially outward from opposing sides of the sleeve serve to support a pair of connecting arms 64 which protrude forwardly from the side frames respectively in parallel relation to one another and to the longitudinal rolling axis. The connecting arms are mounted on the side frames respectively such that the connecting arms are diametrically opposite one another relative to the longitudinal rolling axis while also being at diametrically opposing sides of the driveline which is received concentrically through the inlet collar 54 at the leading end of the apparatus. A pair of transverse pins 66 are fixed at the leading end of the connecting arms 64 respectively to extend laterally outward therefrom along a common lateral pitch axis 68 relative to one another. The transverse pins 66 are laterally spaced apart from one another and suitably oriented for being received within mating mounting locations on the two lower hitch arms 16 of the towing vehicle. The transverse pins are arranged to be pivotally coupled to the hitch arms 16 of the towing vehicle so that the pivoting movement of the coupling frame relative to the hitch connector of the towing vehicle defines the lateral pitch axis 68.

The wheeled frame 26 of the apparatus includes a crossbar member 70 which extends in a lateral direction between opposing ends of the crossbar member. Two wheels 72 are mounted on the opposing ends of the crossbar member 70 respectively such that each wheel is rotatable relative to the wheeled frame about a common lateral axis of the wheels, wherein the lateral axis is oriented parallel to the crossbar member 70. The wheels are fixed in orientation relative to the crossbar with the lateral axis of rotation of the wheels being generally centred in the longitudinal direction of the apparatus relative to the crossbar.

The wheeled frame further includes a trailing member 74 which is fixed onto the crossbar member 70 at a laterally centred location to extend rearwardly in a trailing relationship with the crossbar member. The trailing member is fixed to the crossbar to extend rearward to a rear end supporting a hitch tongue 76 thereon in the form of a generally horizontal plate with a mounting aperture extending therethrough. The mounting aperture serves for attachment of a hitch, for example a hitch ball or hitching ring or other suitable hitch connector that is capable of coupling the implement thereon while allowing some relative movement of the implement relative to the wheeled frame.

The wheeled frame 26 further includes a pivot coupling at a laterally centred location within the crossbar member which defines the first upright axis of pivotal movement of the wheeled frame relative to the longitudinal frame. The pivot coupling includes top and bottom pivot support plates 78 mounted at top and bottom sides of the crossbar member with respective openings therein which are aligned with one another along the upright axis. A pivot shaft 80 extends along the first upright axis fully through the pivot support plates 78 at the top and bottom sides of the crossbar member so that the pivot shaft is freely rotatable relative to the wheeled frame. Retainer flanges 82 are fixed to the pivot shaft 80 at opposing top and bottom end thereof for abutting corresponding upper and lower faces of the top and bottom pivot support plates 78 respectively to axially locate the pivot shaft 80 relative to the crossbar while the pivot shaft remains freely rotatable relative to the crossbar member. The longitudinal frame is coupled to the pivot shaft 80 as described in further detail below to enable the longitudinal frame to be pivotal relative to the wheeled frame 26 about the first upright axis 30. As shown in FIG. 1, a pin 83 defines a latch member of a latching mechanism operatively connected between the longitudinal frame and the wheeled frame. The pin is movable between a latched position in which the latch member restricts relative pivotal movement between the longitudinal frame and the wheeled frame about the first upright axis and a released position in which the latch member does not restrict relative pivotal movement between the longitudinal frame and the wheeled frame about the first upright axis. The pin 83 is operable to fix the wheeled frame relative to the longitudinal frame in a straight position in which the wheels are oriented for rolling in the longitudinal direction of the longitudinal frame.

The wheeled frame 26 further includes a mounting plate 84 supported on the top side of the trailing member 74 at a location which is spaced rearwardly from the crossbar and from the first upright axis. The mounting plate 84 is generally parallel to the crossbar and perpendicular to the forward working direction. The mounting plate 84 includes a central opening supporting a bearing therein which in turn supports the output member 36 of the driveline rotatably therein. The output member is supported by the bearing in fixed orientation relative to the mounting plate such that an axis of the output member of the driveline remains oriented in the rolling direction of the wheels of the wheeled frame corresponding approximately to the forward working direction.

An additional cover plate 86 is mounted at the top end of the mounting plate 84 to protrude both forwardly and rearwardly from the mounting plate for shielding a portion of the driveline immediately ahead of and rearward of the mounting plate 84.

A pair of poles 88 extend upward from the ends of the crossbar member 70 respectively for supporting respective navigation lights 90 thereon.

The longitudinal frame 28 comprises a tubular frame member 92 which extends in a respective longitudinal direction to span a majority of the length of the longitudinal frame, and a majority of the length of the overall apparatus. The tubular frame member 92 extends at a downward slope from a leading end to a trailing end thereof. A mounting arm 94 is fixed to the leading end of the tubular frame member 92 to extend forward at a downward inclination to a front end of the mounting arm which is fixed externally onto a sleeve 96. The sleeve 96 has an inner diameter which closely fits about the outer diameter of the outlet collar 50 of the coupling frame at the leading end of the apparatus. The retainer flange 52 is fixed to the top end of the outlet collar in a manner which restricts the axial position of the sleeve 96 along the outlet collar while enabling the sleeve to remain freely rotatable about the outlet collar 50. A layer of bushing material having a low coefficient of friction may be provided between the inner surface of the sleeve and the outer surface of the outlet collar, or alternatively a layer of grease may be provided therebetween, to ensure that the sleeve 96 is freely rotatable about the outlet collar. The sleeve 96 may be further provided with end flanges 98 which extend radially outward from top and bottom ends of the sleeve 96 respectively. The outer end faces of the end flanges 98 are abutted in rotatable engagement with corresponding surfaces at the inner side of the retainer flange 52 thereabove and on the end face of the top wall of the housing 44 of the intermediate portion of the coupling frame therebelow. The rotatable connection thus supports axial loads and radial loads between the intermediate frame and the coupling frame, similarly to the other pivot connections of (i) the longitudinal frame to the wheeled frame, and (ii) the intermediate portion of the coupling frame to the coupling portion of the coupling frame.

An input housing 100 is provided at the leading end of the longitudinal frame. The input housing as a hollow interior which is open at the rear side to the hollow interior of the tubular frame member 92 upon which it is fixedly supported. The hollow interior of the input housing is also open at the bottom end thereof to the hollow interior of the outlet collar while the input housing 100 of the longitudinal frame remains pivotal relative to the outlet collar about the second upright axis 32.

An upper gearbox 102 is located within the input housing 100 of the longitudinal frame. The gearbox has a housing which is fixed relative to the input housing. The upper gearbox comprises a right-angle gearbox having an input shaft 104 and an output shaft 106 which are offset 90 degrees from one another and which are connected internally to one another using beveled gears in meshing relationship with one another in the usual manner of a right-angle gearbox. The input shaft 104 is coupled to an upright shaft 108 which is vertically oriented and is substantially concentric with the second upright axis 32 as well as being concentric with the sleeve 96 and the outlet collar 50.

The bottom end of the upright shaft 108 is coupled to the output shaft 110 of a lower gearbox 112. Similarly to the upper gearbox, the lower gearbox has a housing which is fixed relative to the corresponding housing within which it is received, that is the housing 44 of the intermediate portion of the coupling frame in this instance. In addition to the output shaft 110, the lower gearbox 112 includes an input shaft 114 which is offset from the output shaft by 90 degrees while being connected internally to one another using beveled gears in meshing relationship with one another in the usual manner of a right-angle gearbox. The input shaft 114 of the lower gearbox is concentrically aligned with the longitudinal rolling axis 42 and with the sleeve 56 rotatably supported about the inlet collar 54.

Figure 2:
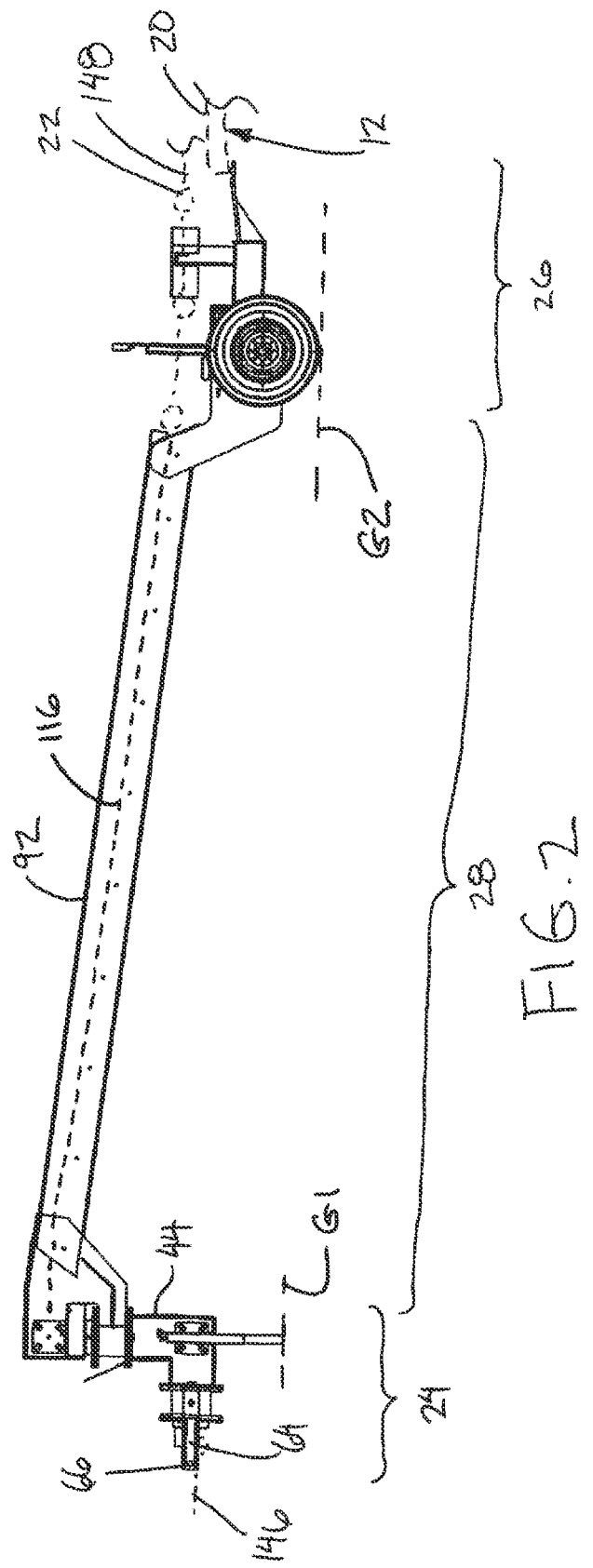
FIG. 2 is a side elevational view of the articulated towing apparatus.

The longitudinal frame member supports a longitudinal driveshaft 116 therein which extends the full length of the tubular frame member within which it is received. The longitudinal driveshaft 116 is generally concentric with the tubular frame member 92 such that the longitudinal driveshaft 116 also extends at a downward slope from the leading end to the trailing end thereof. More particularly as shown in FIG. 2, when the leading end of the longitudinal frame is supported above a first ground surface portion G1 and the trailing end is supported above a second ground surface portion G2 that is at a common elevation with the first ground surface portion, the longitudinal frame member 92 and the longitudinal driveshaft 116 received concentrically therein extend at a downward slope from the leading end to the trailing end of the frame. In this manner, the longitudinal drive shaft is arranged to extend at a downward slope from the leading end to the trailing end of the driveline when the rotary driven implement and the towing vehicle are at a common elevation. The driveshaft 116 is supported rotatably relative to the tubular frame member by a plurality of bearings 118 mounted about the driveshaft and supported relative to the surrounding tubular frame member by respective mounting plates at longitudinally spaced positions along the length of the tubular frame member 92.

The driveshaft 116 is connected to the output shaft 106 of the upper gearbox by a universal connection. The universal connection includes a first universal joint 120 coupled to the output shaft 106 and a second universal joint 122 connected to the leading end of the longitudinal driveshaft, with an intermediate shaft 124 being connected between the first and second universal joints. The intermediate shaft 124 is slightly angularly offset from the output shaft of the upper gearbox by the first universal joint 120 while the driveshaft 116 is similarly angularly offset from the intermediate shaft by the second universal joint 122.

At the trailing end of the longitudinal frame, a further mounting arm 126 is mounted in fixed relation to the tubular frame member 92 to extend rearwardly from the bottom of the tubular frame member at a downward slope to a rear end of the mounting arm. The rear end of the mounting arm 126 is forked to define an upper portion 128 extending above the crossbar member of the wheeled frame and a lower portion 130 extending below the crossbar member of the wheeled frame. The upper portion 128 and the lower portion 130 are fixedly coupled to the top end and bottom end respectively of the pivot shaft 80 of the pivot coupling on the wheeled frame 26.

A steering actuator 132 is provided for controlling pivotal movement of the wheeled frame relative to the longitudinal frame about the first upright axis 30. The steering actuator is a linear hydraulic actuator which is supported at a location spaced rearward of the crossbar so as to extend generally parallel to the crossbar in the lateral direction of the crossbar. A first crank 134 is fixed onto the crossbar towards one of the ends of the crossbar for mounting a first end of the steering actuator pivotally thereon. A second crank member 136 is fixed relative to the longitudinal frame to extend rearwardly from the upper portion 128 of the mounting arm at the trailing end of the longitudinal frame. The second crank member 136 pivotally couples a second end of the steering actuator thereon. In this manner extending and retracting the overall length of the actuator causes the wheeled frame to be pivoted between the straight configuration shown in FIG. 3 and the offset configuration shown in FIG. 6.

In the straight configuration, the wheeled frame and the implement connected thereto follow the path of the vehicle by orienting the longitudinal frame to extend perpendicularly to the crossbar of the wheeled frame and parallel to the forward working direction. The wheels are oriented for rolling in the forward working direction parallel to the longitudinal frame in this instance.

In the offset configuration, the wheeled frame and the implement connected thereto follow a path which is parallel and laterally offset to one side of the path of the vehicle by orienting the longitudinal frame to extend transversely to the forward working direction and non-perpendicularly to the crossbar. The wheels are oriented for rolling in the forward working direction transversely to the longitudinal frame in this instance.

The driveline further comprises a universal connection between a rear end of the longitudinal driveshaft 116 at the trailing end of the tubular frame member 92 and the output member 36 that is rotatably supported on the wheeled frame. The universal connection at the trailing end of the driveshaft includes a first universal joint 138 coupled to the rear end of the longitudinal driveshaft at a location spaced forwardly of the first upright axis 32 and a second universal joint 140 coupled to the leading end of the output member 36 at a location spaced rearwardly of the first upright axis 32. An intermediate shaft 142 is coupled between the first and second universal joint 138 and 140.

In order to couple the driveline of the apparatus to the power takeoff shaft 18 of the towing vehicle, the input member 34 is a shaft supported by respective bearings coaxially within the inlet collar 54 at the leading end of the apparatus. A leading universal connection 146 may be coupled at the leading end of the input shaft 34 which forms the connection to the shaft 18 of the towing vehicle. The universal connection 146 may comprise an intermediate shaft connected between first and second universal joints similarly to the universal connections described above.

In order to couple the driveline of the apparatus to the drive input of the implement, a similar output universal connection 148 may be connected between the output member 36 at the trailing end of the apparatus and the drive input of the implement. The output universal connection 148 may comprise an intermediate shaft connected between first and second universal joints similarly to the universal connections described above.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An articulated towing apparatus for pulling a rotary driven implement in a forward working direction across a ground surface behind a towing vehicle having a power take-off member, the apparatus comprising:

a longitudinal frame which is elongate in a longitudinal direction between a leading end and a trailing end;

a wheeled frame supported on wheels for rolling movement along the ground surface in which the wheels are fixed in orientation relative to the wheeled frame, the wheeled frame being pivotally coupled to the longitudinal frame in proximity to the trailing end such that the wheeled frame is pivotal relative to the longitudinal frame about a first upright axis, and the wheeled frame including a hitch coupling being adapted to releasably connect the rotary driven implement thereto in trailing relationship with the wheeled frame while allowing some movement of the rotary driven implement relative to the wheeled frame;

a coupling frame adapted to be connected to the towing vehicle, the coupling frame being pivotally coupled to the longitudinal frame in proximity to the leading end such that the coupling frame is pivotal relative to the longitudinal frame about a second upright axis;

a driveline including a longitudinal drive shaft supported on the longitudinal frame, the longitudinal drive shaft being operatively connected to an input member at a leading end of the driveline and being operatively connected to an output member at a trailing end of the driveline, the input member being adapted to connect to the power take-off member of the towing vehicle and the output member being adapted to connect to the rotary driven implement;

the driveline further comprising:

a lower gearbox supported on the coupling frame, the lower gearbox having an input connected to the input member and an output;

an upright shaft connected to the output of the lower gearbox;

an upper gearbox supported on the longitudinal frame above the lower gearbox in proximity to the leading end of the longitudinal frame, the upper gearbox having an input connected to the upright shaft and an output operatively connected to the longitudinal drive shaft; and a universal connection at the trailing end of the longitudinal frame, the universal connection operatively connecting the longitudinal drive shaft to the output member of the driveline; and the longitudinal drive shaft being arranged to extend at a downward slope from the leading end to the trailing end of the driveline when the rotary driven implement and the towing vehicle are at a common elevation.

2. The apparatus according to claim 1 wherein the longitudinal frame is hollow and receives the longitudinal drive shaft therein.

3. The apparatus according to claim 2 wherein the longitudinal frame includes a tubular frame member spanning a majority of a length of the longitudinal frame, the tubular frame member extending at a downward slope from the leading end to the trailing end of the longitudinal frame and receiving the longitudinal drive shaft therein.

4. The apparatus according to claim 1 wherein the output member is rotatably supported on the wheeled frame such that an axis of rotation of the output member is fixed in orientation relative to the wheeled frame, whereby the output member is movable together with the wheeled frame for pivotal movement about the first upright axis relative to the longitudinal frame.

5. The apparatus according to claim 4 wherein the output member is rotatably supported on the wheeled frame at a location spaced rearwardly from the first upright axis.

6. The apparatus according to claim 4 wherein the universal connection of the driveline comprises an intermediate shaft operatively connected to the longitudinal drive shaft by a first universal joint ahead of the first upright axis and operatively connected to the output member by a second universal joint behind the first upright axis.

7. The apparatus according to claim 1 wherein the wheeled frame comprises a crossbar member pivotally coupled to the trailing end of the longitudinal frame for relative pivotal movement about the first upright axis, the crossbar member extending in a lateral direction between opposing ends, each opposing end supporting a respective one of the wheels thereon, the wheeled frame being adapted to releasably connect the rotary driven implement thereto at a location spaced rearwardly of the first upright axis.

8. The apparatus according to claim 1 wherein the driveline further comprises a universal connection operatively connecting the longitudinal drive shaft to the output of the upper gearbox.

9. The apparatus according to claim 8 wherein the coupling frame comprises:
- an intermediate portion supporting the lower gearbox thereon, the intermediate portion being connected to the longitudinal frame for relative pivotal movement about the second upright axis;
- a coupling portion adapted to be connected to the towing vehicle;
- the coupling portion and the intermediate portion being pivotally coupled to one another for relative pivotal movement about a longitudinal roll axis oriented in the forward working direction.

10. The apparatus according to claim 9 wherein the coupling portion is adapted to be coupled to the towing vehicle so as to be pivotal relative to the towing vehicle about a lateral axis oriented transversely to the forward working direction.

11. The apparatus according to claim 10 wherein the coupling portion comprises a pair of coupling pins which are spaced apart along the lateral axis at diametrically opposing sides of the driveline.

12. The apparatus according to claim 9 wherein the driveline is supported in alignment with the longitudinal roll axis at the leading end of the longitudinal frame.

13. The apparatus according to claim 1 further comprising a latching mechanism operatively connected between the longitudinal frame and the wheeled frame, the latching mechanism including a latch member which is movable between a latched position in which the latch member restricts relative pivotal movement between the longitudinal frame and the wheeled frame about the first upright axis and a released position in which the latch member does not restrict relative pivotal movement between the longitudinal frame and the wheeled frame about the first upright axis.

14. The apparatus according to claim 13 wherein the latching mechanism is operable to fix the wheeled frame relative to the longitudinal frame in a straight position in which the wheels are oriented for rolling in the longitudinal direction of the longitudinal frame.

15. The apparatus according to claim 1 further comprising a steering actuator operatively connected between the longitudinal frame and the wheeled frame such that the wheeled frame is pivoted relative to the longitudinal frame about the first upright axis under control of the steering actuator.

16. The apparatus according to claim 15 wherein the wheeled frame supports the wheels thereon for rolling movement about a wheel axis, and wherein the steering actuator comprises a linear actuator which is oriented substantially parallel to the wheel axis.

17. The apparatus according to claim 1 wherein the longitudinal drive shaft is arranged to extend at a downward slope from the leading end to the trailing end of the driveline when the leading end of the longitudinal frame is supported above a first ground surface portion and the trailing end is supported above a second ground surface portion that is at a common elevation with the first ground surface portion.

18. An articulated towing apparatus for pulling a rotary driven implement in a forward working direction across a ground surface behind a towing vehicle having a power take-off member, the apparatus comprising:
- a longitudinal frame which is elongate in a longitudinal direction between a leading end and a trailing end;
- a wheeled frame supported on wheels for rolling movement along the ground surface in which the wheels are fixed in orientation relative to the wheeled frame, the wheeled frame being pivotally coupled to the longitudinal frame in proximity to the trailing end such that the wheeled frame is pivotal relative to the longitudinal frame about a first upright axis, and the wheeled frame including a hitch coupling being adapted to releasably connect the rotary driven implement thereto in trailing relationship with the wheeled frame while allowing some movement of the rotary driven implement relative to the wheeled frame;
- a coupling frame adapted to be connected to the towing vehicle, the coupling frame being pivotally coupled to the longitudinal frame in proximity to the leading end such that the coupling frame is pivotal relative to the longitudinal frame about a second upright axis;
- a driveline including a longitudinal drive shaft supported on the longitudinal frame, the longitudinal drive shaft being operatively connected to an input member at a leading end of the driveline and being operatively connected to an output member at a trailing end of the driveline, the input member being adapted to connect to the power take-off member of the towing vehicle and the output member being adapted to connect to the rotary driven implement;
- wherein the output member is rotatably supported on the wheeled frame such that an axis of rotation of the output member is fixed in orientation relative to the wheeled frame, whereby the output member is movable together with the wheeled frame for pivotal movement about the first upright axis relative to the longitudinal frame.

19. The apparatus according to claim 18 wherein the output member is rotatably supported on the wheeled frame at a location spaced rearwardly from the first upright axis.

* * * * *